United States Patent
Kutaragi et al.

(10) Patent No.: US 7,761,328 B2
(45) Date of Patent: Jul. 20, 2010

(54) IN-CONTENTS ADVERTISING METHOD, IN-CONTENTS ADVERTISING SERVER, AND PROGRAM-TRANSFERRING MEDIUM FOR REALIZING IN-CONTENTS ADVERTISING

(75) Inventors: Ken Kutaragi, Kanagawa (JP); Shinichi Okamoto, Tokyo (JP); Keiso Shimakawa, Kanagawa (JP); Makoto Kubo, Tokyo (JP); Yutaka Kagiwada, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 985 days.

(21) Appl. No.: 09/780,995

(22) Filed: Feb. 9, 2001

(65) Prior Publication Data

US 2002/0004743 A1    Jan. 10, 2002

(30) Foreign Application Priority Data

Jul. 4, 2000    (JP)    .............................. 2000-241861
Dec. 8, 2000    (JP)    .............................. 2000-375096

(51) Int. Cl.
G06Q 30/00    (2006.01)
(52) U.S. Cl. .................. 705/14.4; 705/14.49; 705/14.73
(58) Field of Classification Search .................. 705/14, 705/14.4, 14.49, 14.73; 713/200
See application file for complete search history.

(56) References Cited

U.S. PATENT DOCUMENTS

| | | | | |
|---|---|---|---|---|
| 5,835,087 A | * | 11/1998 | Herz et al. .................. 715/810 |
| 5,892,900 A | * | 4/1999 | Ginter et al. ................. 713/200 |
| 5,946,664 A | * | 8/1999 | Ebisawa ....................... 705/14 |
| 6,385,596 B1 | * | 5/2002 | Wiser et al. .................... 705/51 |
| 6,904,408 B1 | * | 6/2005 | McCarthy et al. .............. 705/2 |
| 7,146,567 B1 | * | 12/2006 | Duczmal et al. ............ 715/736 |
| 2002/0010623 A1 | * | 1/2002 | McCollom et al. ............ 705/14 |
| 2002/0068525 A1 | * | 6/2002 | Brown et al. ............... 455/3.01 |

FOREIGN PATENT DOCUMENTS

| | | |
|---|---|---|
| JP | 2000-029712 | 1/2000 |
| JP | 2000-126457 | 5/2000 |
| JP | 2000-510352 | 8/2000 |
| KR | 2000-0024643 | 5/2000 |
| KR | 10-0516552 | 6/2006 |
| WO | 97/26061 | 7/1997 |
| WO | 98/29974 | 7/1998 |

OTHER PUBLICATIONS

Notice of Preliminary Rejection mailed Dec. 13, 2006, from corresponding Korean Application 10-2002-7002898.

* cited by examiner

*Primary Examiner*—Raquel Alvarez
(74) *Attorney, Agent, or Firm*—Katten Muchin Rosenman LLP

(57) ABSTRACT

Advertisement information appropriated beforehand is inserted into contents such as a game downloaded by a user at the point that the user activates the contents, based on advertisement-insertable information within the game data or the like, and subsequently advertisement information is displayed at corresponding areas while the contents are running, thereby realizing an advertisement system capable of dealing with network infrastructures.

17 Claims, 9 Drawing Sheets

IN-CONTENTS ADVERTISING METHOD, IN-CONTENTS ADVERTISING SERVER, AND PROGRAM-TRANSFERRING MEDIUM FOR REALIZING IN-CONTENTS ADVERTISING

FIELD OF THE INVENTION

The present invention relates to an in-contents advertising method, an in-contents advertising server, and a program-transferring medium for realizing in-contents advertising, suitable for displaying advertisements of advertisers in contents such as games. More specifically, the present invention obtains advertisement information appropriated beforehand to contents, at the time of activation of the contents, and inserts the advertisement information in the contents, based on commissioning from advertisers, and information contained within contents indicating that advertisements may be inserted, thereby enabling advertising within the contents.

BACKGROUND OF TIE INVENTION

Conventionally, there are cases wherein actual advertisements of advertisers are displayed within contents such as games. A most classic example is in a driving game, wherein advertisements are pasted onto sign boards around the course as textures. With such in-game advertising, the game software company which creates the contents finds an advertiser, creates texture data based on commissioning from the advertiser, and sets this in the game advertisement area as texture. The game program data and texture containing the advertising texture, and audio data, are temporarily stored on a hard disk or the like by an authoring tool, then sent to the optical disk manufacturing process, and stamped by a stamper. The stamper manufactures massive numbers of optical disks.

Once such contents reach the user in the form of an optical disk, the user can view the advertisements of the advertiser within the in-game advertising areas on the signs within the game space.

However, with the above method, the contents are placed on a medium and distributed to the user, and cannot be applied to advertisements dealing with digital contents distribution modes using networks. Also, the same advertisement is displayed indefinitely in the same advertising area, unless a new stamper is made. Accordingly, it is difficult to easily update the contents of advertisements whenever appropriate according to requests from the advertisers and so forth.

SUMMARY OF THE INVENTION

The present invention has been made to solve the above-described problems.

Accordingly, the in-contents advertising method according to the present invention includes advertisement information provided beforehand in contents, based on information contained within contents indicating that advertisements may be inserted within the contents.

Also, the in-contents advertising server according to the present invention inserts advertisement information in contents, based on specifications of the advertiser, and information contained within contents indicating that advertisements may be inserted.

Also, the program transferring medium according to the present invention is for realizing in-contents advertisements by obtaining advertisement information appropriated beforehand to the contents, at the time of activation of the contents, and inserting the advertisement information in the contents, based on information contained within contents indicating that advertisements may be inserted.

Also, the digital contents distribution system according to the present invention for realizing in-contents advertisements comprises: a digital contents distribution system comprising a first server storing a plurality of digital contents to be provided; an advertisement information providing system comprising a database storing advertisement information which is to be set in advertisement areas in the digital contents; and a plurality of user terminal devices; wherein, in response to download requests for specific digital contents from the users, the digital contents distribution system receives advertisement information corresponding to the specific digital contents from the database of the advertisement information providing system, and subsequently distributes the specific digital contents to the user.

Also, the digital contents distribution system for realizing in-contents advertisements according to the present invention comprises: a digital contents distribution system comprising a first server storing a plurality of digital contents to be provided; an advertisement information providing system comprising a database storing advertisement information which is to be set in advertisement areas in the digital contents; and a plurality of user terminal devices; wherein, in response to download requests for specific digital contents from the users, the digital contents distribution system distributes the specific digital contents to the user; and wherein the advertisement information providing system transmits advertisement information corresponding to the specific digital contents from the database, to the user.

Now, the digital contents distribution system according to the present invention may configure a network of the digital contents distribution system comprising the first server, the advertisement information providing system comprising the database, and the plurality of user terminal devices, using one, or two or more, of the following means: cable television, broad-band wireless network, and optical fiber network.

Also, the digital contents distribution system according to the present invention may further comprise means for recording the transmission state of the advertisement information, with advertising fees being calculated based on the recording results, and may further comprise a contents providing system for creating contents and providing the contents to the digital contents providing system, and an advertisement creating system for creating advertisement information and providing the advertisement information to the advertisement information providing system.

The digital contents distribution system may further comprise a banking system, wherein the advertisement information providing system comprises means for recording the transmission state of the advertisement information, with advertising fees being calculated based on the recording results, and the advertiser is billed for the advertising fees from the bank.

Also, the advertisement information providing system may provide the advertisement creating system with advertisement structure information containing at least portions and times regarding which advertisement insertion can be made, and the advertisement creating system may provide the advertisement information creating system with advertisement information created based on the advertisement structure information and specified information from the advertiser.

Further, the digital contents data may contain advertisement programs, with the advertisement information being set into the digital contents by the advertisement programs.

Also, the digital contents providing system according to the present invention comprises a plurality of servers storing digital contents, wherein the digital contents providing system configures an advertisement information providing system having a database storing advertisement information to be set into advertising areas within the digital contents, and a network, and wherein, in response to download requests for digital contents from the users, the digital contents distribution system receives corresponding advertisement information from the database, and distributes the advertisement information along with the requested digital contents.

DESCRIPTION OF THE PREFERRED EMBODIMENTS

The following is a description of an embodiment of the present invention, with reference to FIGS. 1 through 9 in order.

Figure 1:
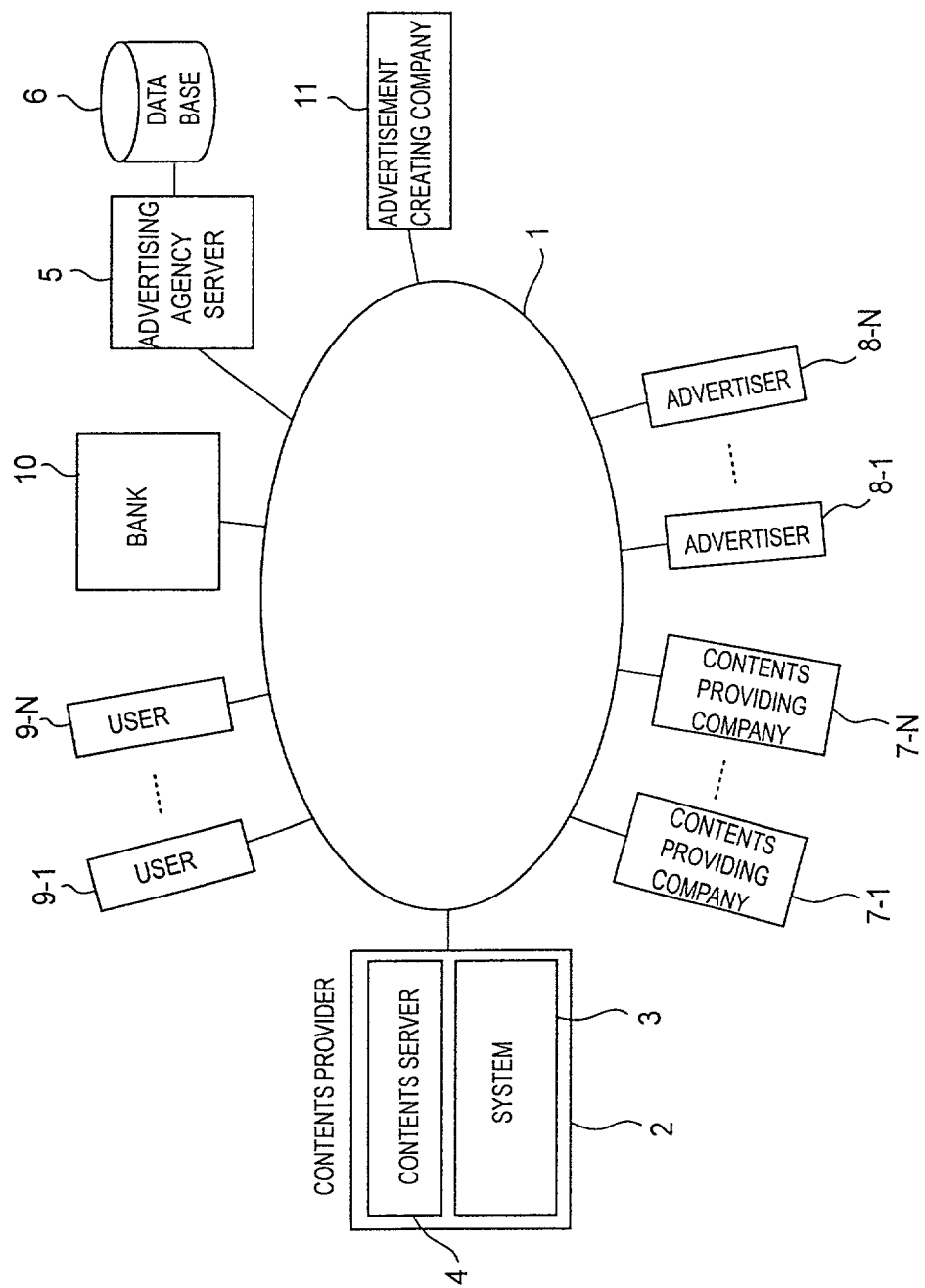
FIG. 1 is a block diagram illustrating an overall system connected to a network.

FIG. 1 is a block diagram illustrating an overall system wherein a related server or terminal is connected to a network 1, such as cable television, a broad-band wireless network, or an optical fiber network, for example. As shown in FIG. 1, connected to the network I are a contents provider system 2 made up of a contents server 4 and a system 3, an advertising agency server 5 having a database 6 such as advertisement information data and the like for configuring an advertisement information creating system, terminals 7-1 through 7-N which are terminals of a contents providing company such as a game software company or the like, advertiser terminals 8-1 through 8-N, user terminals 9-1 through 9-N, a bank server 10, and an advertisement creating company server I 1.

Now, the contents server 4 is for distributing digital contents requested from users 9-1 through 9-N, and stores massive amounts of contents digital contents produced by authoring at the contents providing company 7-1 through 7-N, e.g., contents such as games or the like.

Figure 2:
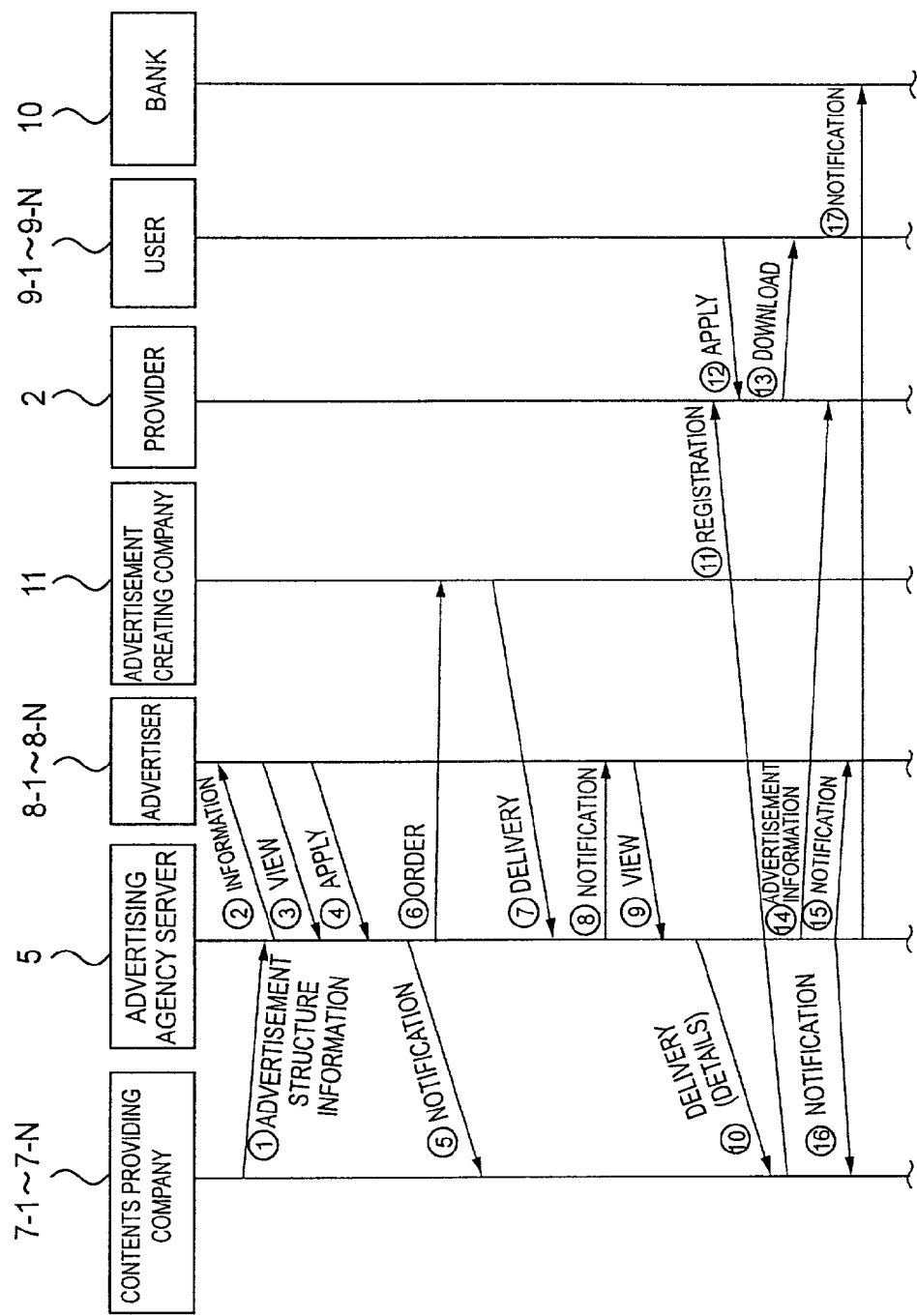
FIG. 2 is a communication flow illustrating information exchange between parties.

The overall system will be described with reference to FIG. 2. The contents providing company 7-1 through 7-N provides the advertising agency server with advertisement structure information indicating portions and time slots in which advertisements can be inserted, demonstration information, etc. ((1) providing advertisement structure information), and this is registered in the database 6 of the advertising agency server 5. The advertising agency server 5 directly informs the advertiser terminals 8-1 through 8-N of the advertisement informing information such as "title", "contents", etc., of a newly-registered title, by mail or otherwise ((2) informing).

The advertiser 8-1 through 8-N can access the advertising agency server 5, and can view the advertisement informing information ((3) viewing), and further apply for advertising from the browser screen ((4) application). Once the advertisers have been decided upon, advertiser specified information such as "advertiser name", time slot, and time period, are notified to the contents providing company terminals 7-1 through 7-N from the advertising agency server 5 by mail or the like ((5) notification). Also, advertiser specified information and advertisement structure information are supplied to the server 11 of the advertisement creating company from the advertising agency server 5 ((6) ordering). The advertisement creating company creates advertisement information based on the advertiser specified information and advertisement structure information. The completed advertisement information such as bitmap data or the like is delivered from the server 11 of the advertisement creating company to the advertising agency server 5 ((7) delivery).

Next, the fact that the advertisement has been completed is notified from the advertising agency server 5 to the advertiser via the terminals 8-1 through 8-N, by mail or the like ((8) notification). The advertiser can view the completed advertisement information on the advertising agency server 5 via the terminals 8-1 through 8-N ((9) viewing). If the advertiser presses an "OK" button or the like here, the product is delivered, and an itinerary is sent from the advertising agency server 5 to the contents providing company via the contents providing company terminals 7-1 through 7-N, by mail or the like. The breakdown of the itinerary is "advertiser", "time slot", "period", "advertising fees", and so forth.

The advertising information from the advertising agency server 5 is provided to the contents providing company via the contents providing company terminals 7-1 through 7-N ((10) delivery (itinerary)). At the contents providing company, the advertisement information is merged with digital contents and advertising programs by authoring processing, and then registered in the contents server 4 of the contents provider 2 ((11) registration).

The user applies for the contents (e.g., a driving game) using terminals 9-1 through 9-N ((12) application), and starts downloading ((13) download). At this time, the contents provider 4 notifies the advertising agency server 5 of the fact of the download request and the title thereof, etc. The advertising agency server 5 transmits the advertisement information data corresponding to the received title to the system 3 of the contents provider 2. If necessary, the contents provided can update the advertisement information based on the advertising program of the digital contents regarding which downloading has been requested, using received updated advertisement information data.

The user can download the requested digital contents via the user terminals 9-1 through 9-N ((14) advertisement information). After downloading the digital contents, the user activating the digital contents renders the updated advertisement information (delivered in the above step (7)) within the contents, by the updated advertising program added to the contents.

On the other hand, the state of advertisement such as the number of sets of digital contents distributed are notified from the advertising agency server 5 to the advertiser via the advertiser terminals 8-1 through 8-N ((15) notification), and also the same information is notified to the contents providing company via the contents providing company terminals 7-1 through 7-N ((16) notification). Further, invoicing of the advertiser and payment amount of the contents providing company based on the same information is notified to the bank by the server 10. Thus, the bank bills the advertiser, and pays the contents providing company.

The in-contents advertising method, in-contents advertising server, and program-transferring medium for realizing in-contents advertising, according to the present invention, described with reference to FIGS. 1 and 2, can be applied to advertising dealing with networks. Also, according to the present invention, contents such as a driving game or the like are provided from a contents server 4 of a contents provider to the user, and advertisement information set in the advertisement areas therein is separately provided to the user from the server 5 of the advertising agency. Accordingly, the advertising information can be readily updated whenever appropriate, without new stamper creation.

Figure 3A:
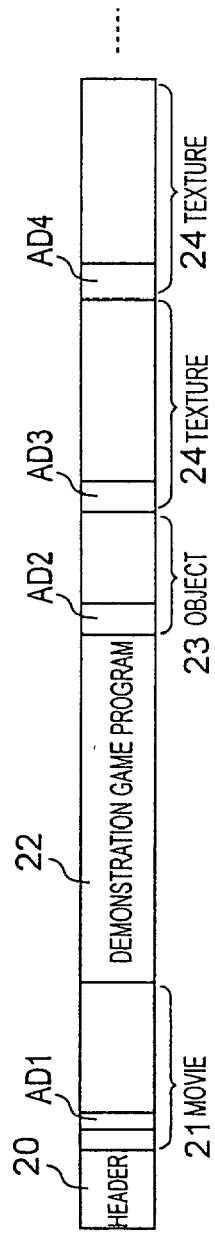
FIGS. 3A and 3B are explanatory diagram illustrating an example of the data configuration of advertising structure information, and a screen example for advertisers.
Figure 3B:
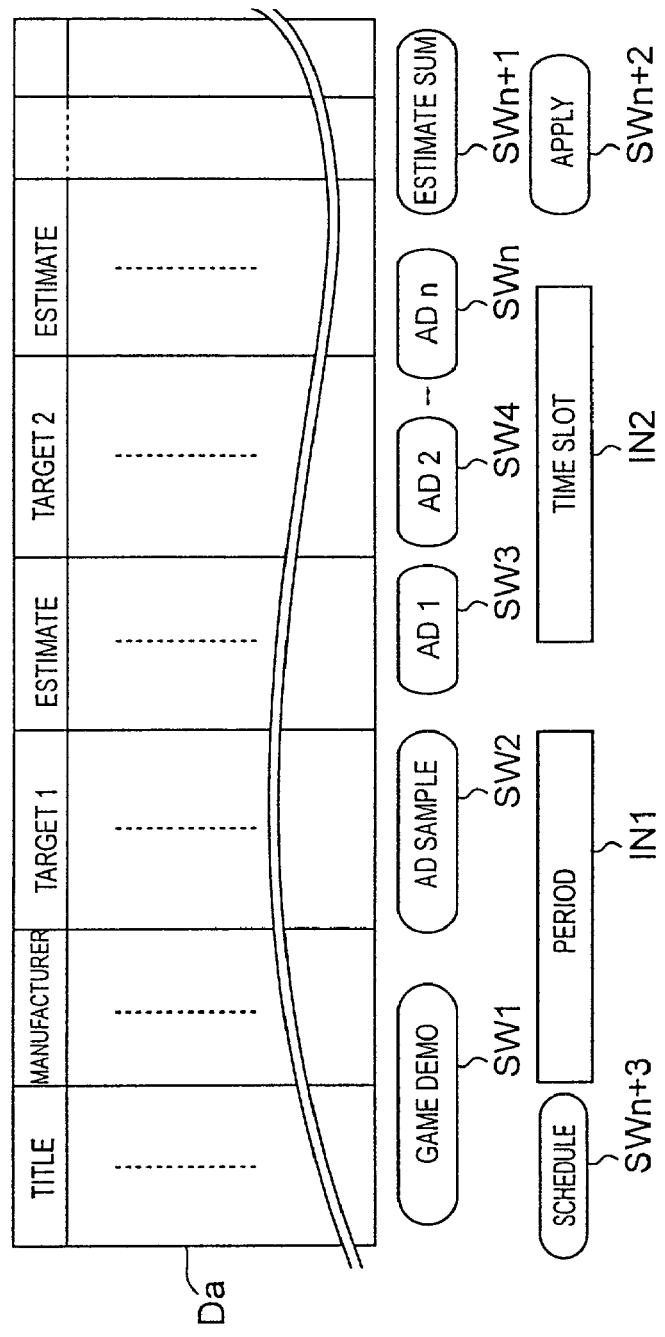

FIGS. 3A and 3B are explanatory diagrams illustrating an example of data configuration of advertisement structure information supplied to the advertising agency server 5 via the contents providing company terminals 7-1 through 7-N in the above advertisement information providing step (1).

As shown in FIG. 3A here, the advertisement structure information is made up of a header with the ID of the contents providing company, title, etc., movie data (graphics data of several tens to several hundreds of frames) 21, a demonstration game program 22, object data 23, multiple sets of texture data 24, and so forth.

Now, the demonstration program 22 is the actual title program simplified for a demonstration. Also, the object data 23 is a collection of coordinates values of objects made up of polygon apex data or the like, for example. The texture data 24 is pattern data of the object data converted from 3-dimensional data to 2-dimensional data by transparent conversion and subsequently written to areas indicated by coordinates value, and in the event that the object data is a racing car, for example, the texture data is the coloring pattern on the body, and so forth.

As shown in FIG. 3A here, advertisement insertable information AD1 is set into the movie 21 area, advertisement insertable information AD2 is set at the head of the object area, and advertisement insertable information AD3 and AD4 are set to the heads of each texture area. For example, AD1 contains information such as a code indicating that advertisements may be inserted, code indicating that the data is a movie, the number of insertion frames, resolution etc., AD2 contains information such as a code indicating that advertisements may be inserted, code indicating that the data is an object, and AD3 and AD4 each contain information such as a code indicating that advertisements may be inserted, code indicating that the insertion format may be any of all or part of texture, code indicating that the data is texture, the range of the texture in the event of all, the range of the texture in the event of part, and so forth. The advertising agency server 5 makes reference to this information and thus generates the viewing screen for the advertiser in the above viewing step (3).

FIG. 3B is a screen display example of a screen which the advertiser can view by accessing the advertising agency server 5. As shown in FIG. 3B here, the display screen is made up of list data Da such as title, manufacturer, advertisement target 1, estimated amount, advertisement target 2, estimated amount, and so forth, and switches and the like displayed below, which are a game demo switch SW1 for executing the game demo, an advertisement sample switch SW2 for showing an advertisement sample, switches SW3 through SWn for specifying advertisement targets 1 through n, and estimate sum switch SWn+1 for calculating and displaying the estimate sum, an input area IN1 for inputting the advertisement carrying period, an input area IN2 for inputting the advertisement carrying time slot, and an applying switch SWn+2 for applying.

In the above applying step (4), the advertiser can watch the game demo and the advertisement sample, select the advertisement object, input the advertisement carrying period and time slot, confirm the estimated sum, and apply, Note that data of the same contents of the above list is formed in the database 6 of the advertising agency server 5.

Figure 4:
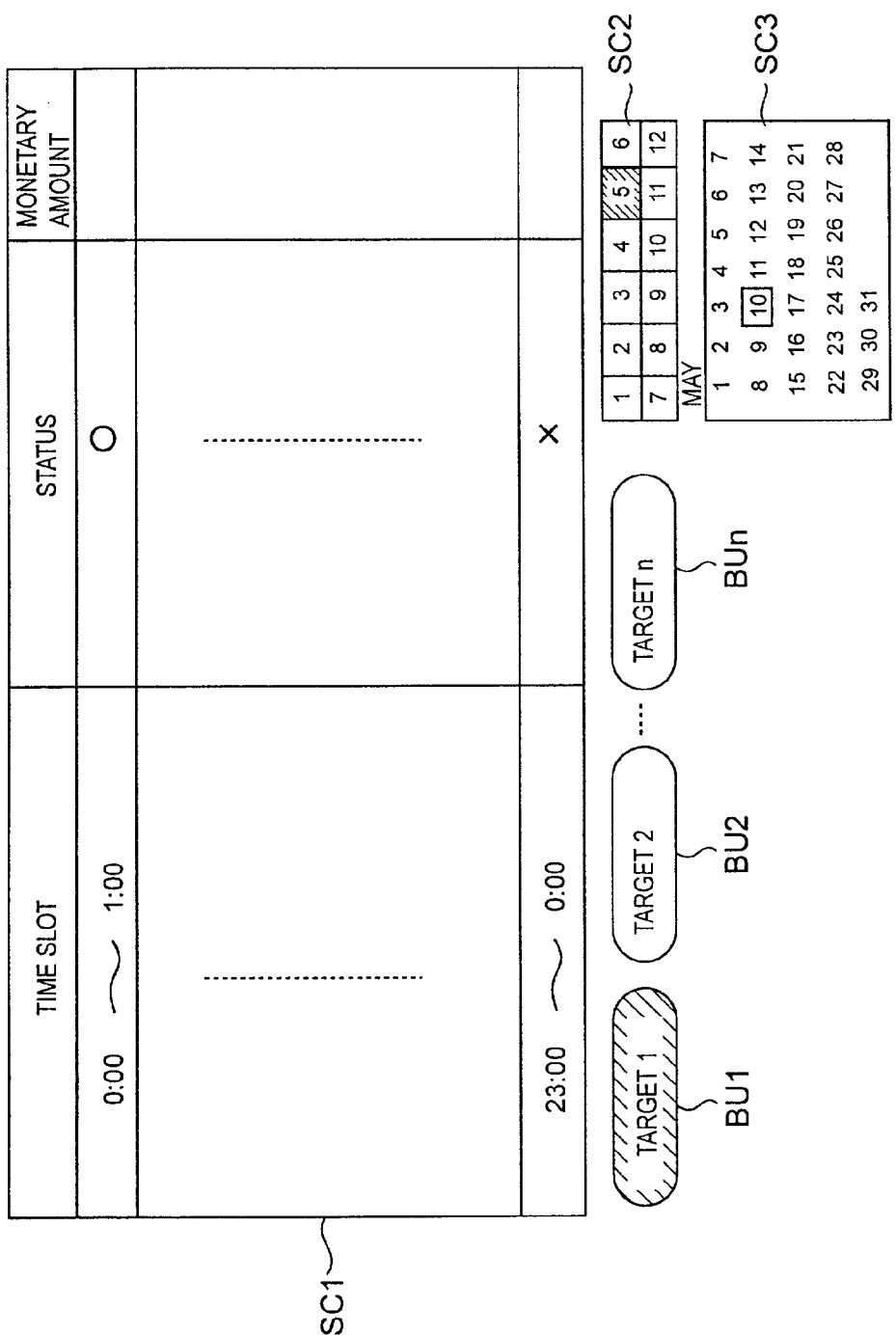
FIG. 4 is a screen example for advertisers indicating the time slot for displaying advertisements, status, and monetary amount.

In the event that the advertiser presses the schedule button SWn+3, a schedule SC1 such as shown in FIG. 4 is displayed on a monitor (not shown) connected to the terminals 8-1 through 8-N of the advertiser, along with buttons Bu1 through Bun for selecting advertising targets, a monthly schedule SC2 for specifying the month, and a daily schedule SC3 for specifying the day.

The schedule SC1 is made up of time slot, status, and monetary amount. The time slot is in increments of one hour, for example. The status indicates whether or not another advertiser has already applied, with a circle meaning that application can be made, and an X implying that application cannot be made. In other words, an X means that another advertiser has already applied for that time slot.

This schedule is made for each advertisement target. As shown in the Figure, advertising target 1 is selected for the current schedule. Here, the button Bu1 for the advertisement target 1 is displayed in inverse (hatched in the figure). Also, May (hatched) is specified for the month, and the 10th (framed) for the day.

Figure 5:
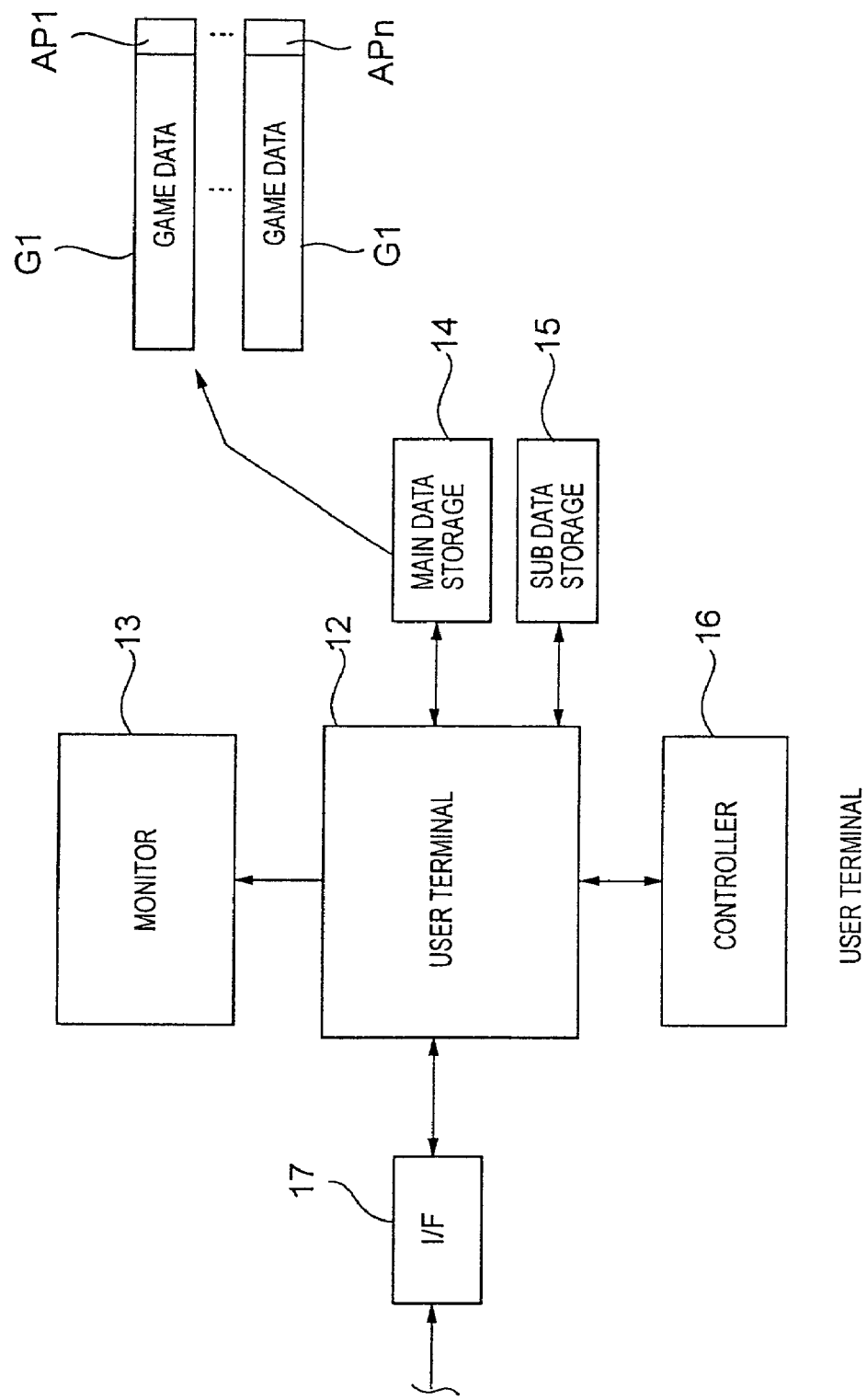
FIG. 5 is a block diagram illustrating a configuration example of a user client terminal.
Figure 6:
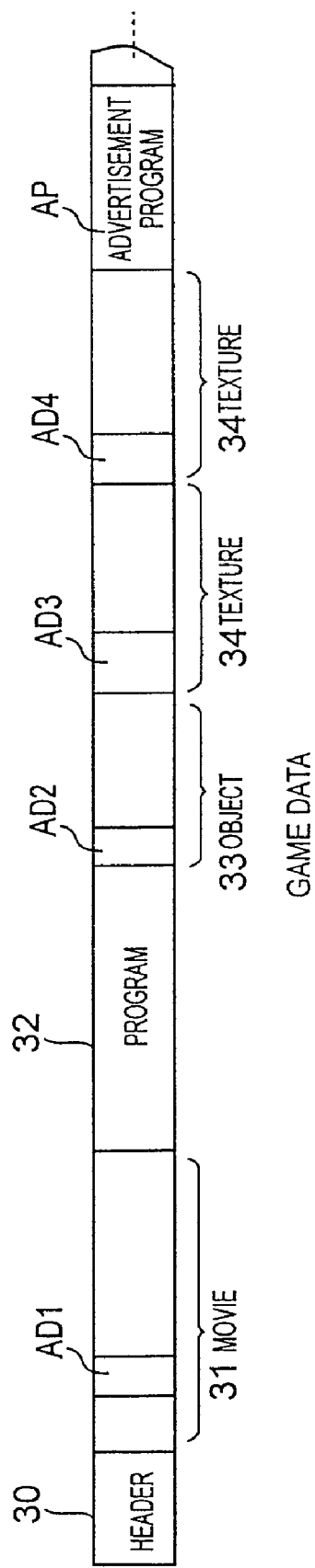
FIG. 6 is an explanatory diagram illustrating the configuration of contents downloaded to the user client terminal.

FIG. 5 is a block diagram illustrating one of the user terminals 9-1 through 9-N, e.g., 9-1. As shown in FIG. 5 here, the user terminal 9-1 comprises a user terminal 12, monitor 13, main data storage 14, sub-data storage 15, controller 16, and interface 17 for network 1. This terminal 9-1 is an entertainment system represented by home game computers for example, wherein the main data storage 14 is a hard disk drive or a high-speed optical disk drive or the like, and the sub-data storage 15 is flash memory. Game data G1 through Gn containing advertisement programs API through APn as shown in FIG. 6 respectively are each stored in the main data storage 14. The other user terminals 9-2 through 9-N are of the same configuration.

As shown in FIG. 6, the sets of game data G1 through Gn are each made up of a header 30 of contents providing company name, title, date of sale, etc., and movie data 31, program data 32, object data 33, multiple sets of texture data 34, advertising program data AP, and so forth. Here, the program data is not a demonstration program like the advertisement structure information, but is an authentic program intended for sale. Also, with regard to the advertising program data, advertisement information is obtained from the advertising agency server 5 based on the embedded above information indicating that advertisements may be inserted, and the advertisement information is displayed in the game.

Figure 7:
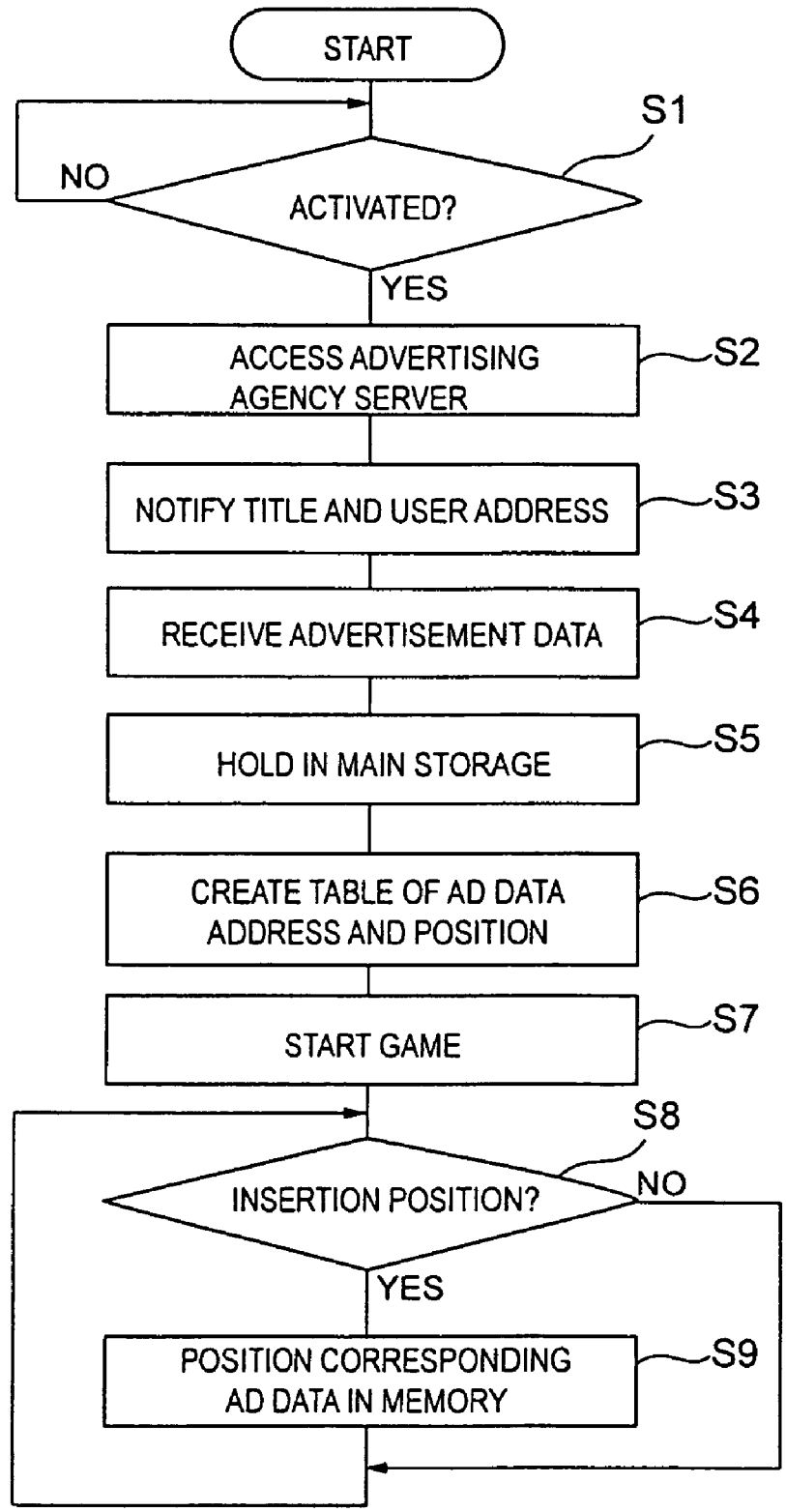
FIG. 7 is a flowchart illustrating advertising operations in the event that a game is activated at the user client terminal.

Next, with reference to FIG. 7, description will be made the advertising carrying operation of the advertising program in the event that the user has activated contents downloaded to an own terminal 9-1 through 9-N.

Once the digital contents such as a game or the like downloaded to the terminals 9-1 through 9-N is activated, the advertisement program is activated, in step S1, judgment is made by the advertisement program whether or not the digital contents have been activated, and in the event that this yields "YES", the flow proceeds to step S2. In step S2, the advertising program accesses the server 5 of the advertising agency, and also in step S3, makes notification of the title of the digital contents activated on the user terminal 9-1 through 9-N, and user address. Thus, the server 5 reads out the advertisement data corresponding to the database 6, and transfers this to the above address. In step S4, the user terminal 9-1 through 9N receives the above advertising data under control of the advertising program, records this in the main data storage 14 (see FIG. 5) in step S5, and in step S6 generates a table of information indicating addresses in the main data storage for advertisement data, and the position of the advertisement target, i.e., information indicating which advertisement insertable information shown in FIG. 6 this is.

Once the game starts in step S7, subsequently in step S8 judgment is made whether or not the position is the position for inserting advertisement information, and in the event that this yields "YES", in step S9 the corresponding advertisement data is positioned at the corresponding position in the memory. It is needless to say that this positioning is made at an earlier point in the progression of the game. Also, an arrangement may be made wherein not all advertisement data is obtained at once, but rather a little is obtained at a time as the game progresses. Further, movie data is preferably placed in the main memory or a graphics engine buffer immediately before the game starts, object data is preferably placed in the main memory either immediately before the game starts or before the data is used, and texture data is preferably placed in the main memory or a graphics engine buffer either immediately before the game starts or before the data is used.

Thus, with driving games for example, arrangements can be realized wherein cars the same as cars actually manufactured and sold by the advertiser can be operated by the user, or wherein advertisements of the advertiser are carried on the body of the car operated by the user, and so forth.

Figure 8:
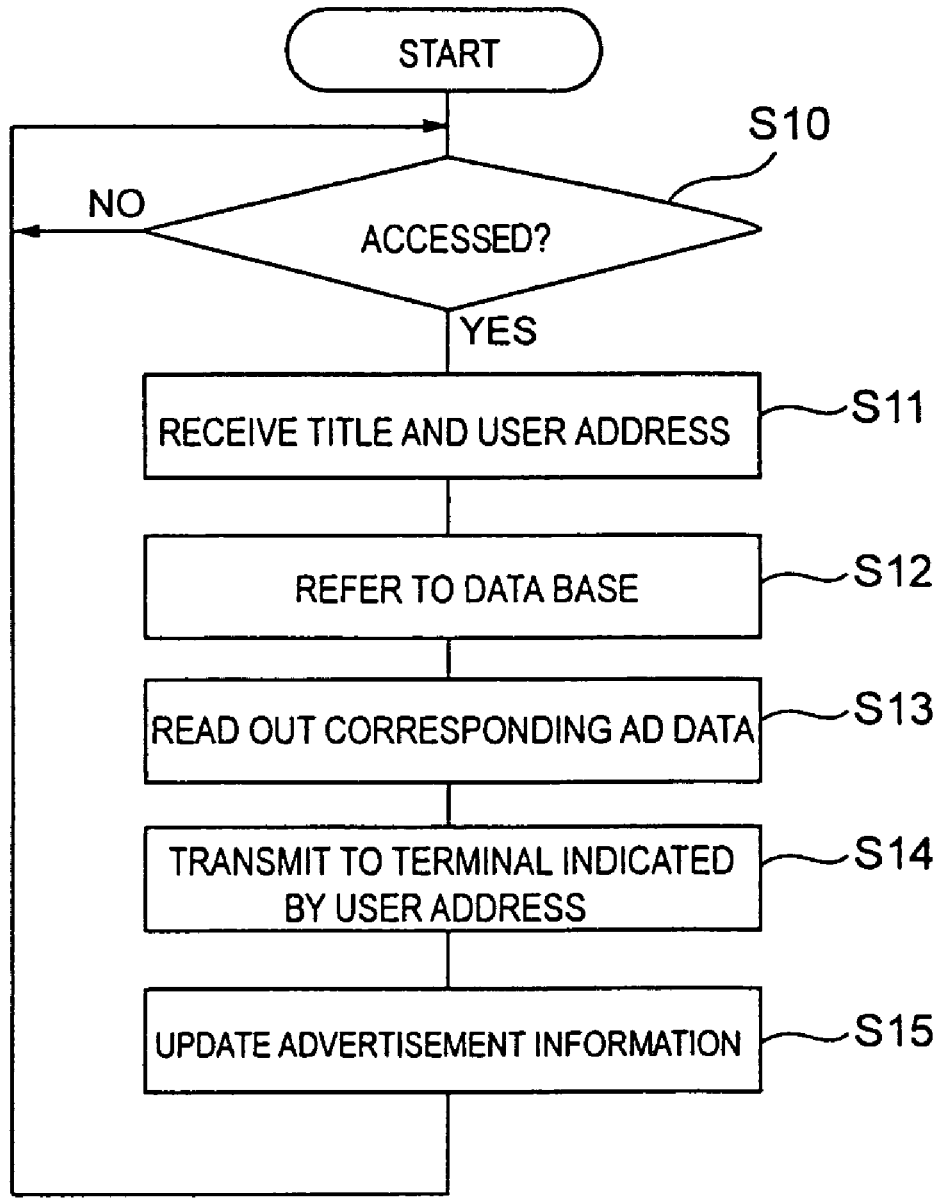
FIG. 8 is a flowchart illustrating the operation of an advertising program which operates on the client terminal where the game has been activated.

Next, with reference to FIG. 8, description will be made regarding operation of the advertising agency server 5 in the event that advertising data is requested by the advertising program.

In step S10, judgment is made regarding whether or not there is access from the user terminals 9-1 through 9-N, and in the event that this yields "YES", the title of the digital contents and the user address is received from the terminals 9-1 through 9-N in step S11, the database 6 is referred to in step S12, advertisement data corresponding to the title is read out in step S13, the advertisement data is transmitted to the user terminals 9-1 through 9-N indicated by the user address received in step S14, and the transmission record for the advertising data is updated in step S15. Counting the number of times of updating the transmission record allows measurement of how many advertisements have been viewed to be made, and payment to the contents providing company and billing the advertiser can be calculated based on this value.

Figure 9:
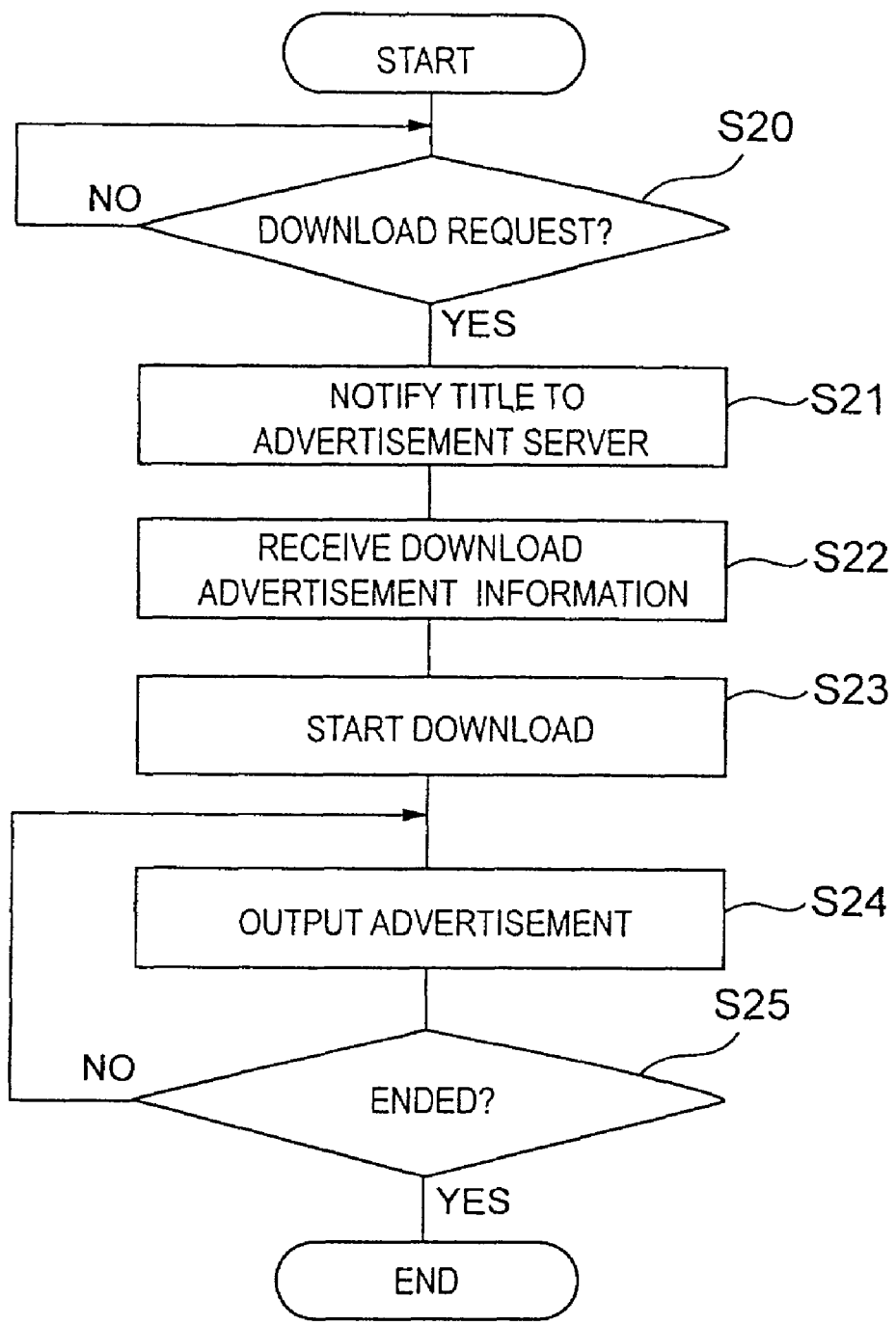
FIG. 9 is a flowchart illustrating the advertisement output operations in the event that game data is being downloaded to the user client terminal.

Next, carrying advertisements at the time of downloading digital contents will be described with reference to FIG. 9.

In step S20, the system 3 of the contents provider 4 judges whether or not there has been a request for downloading digital contents from the user terminals 9-1 through 9-N, and in the event that this yields "YES", the flow proceeds to step S21, and then notifies the title to the advertising agency server 5. The advertising agency server 5 searches the database 6 for the advertising information data corresponding to the received title, and transmits this to the system 3 of the contents provider 2. In step S22, the system 3 of the contents provider 2 receives the downloading advertisement data. In step S23, once the contents server 4 starts downloading the digital contents, the system 3 transmits advertisement information data to the download destination user terminals 9-1 through 9-N in step S24. Thus, a corresponding advertisement is output on the monitor 13 of the downloading user terminals 9-1 through 9-N. In step S25, the system judges whether or not the download from the contents server 4 has ended, and in the event that this yields "YES", the flow ends, and in the event that this is "NO", the flow proceeds to step S24 again.

It should be understood that the present invention is by no means restricted to the above-described embodiment. The present invention can take on other forms such as the following variations, for example.

(1) An arrangement may be made wherein the advertising agency server 5 directly sends advertising information data to the user terminals 9-1 through 9-N. In this case, the advertising agency server 5 needs to receive data indicating starting and ending of downloading from the user terminals 9-1 through 9-N, and also receive the title of digital contents, user address requesting the download, etc., from the system 3 of the contents provider, beforehand.

(2) Though the advertisements in the above example only involved images, it is needless to say that advertisements using audio can be similarly carried.

(3) In the above example, advertisement information is set into the contents each time there is a digital contents download request from the user, but the present invention is not restricted to this. Instead, the advertising information can be updated as necessary regarding advertisement contents, carrying period, etc., based on specifications from the advertiser.

As described above, according to the present invention, an in-contents advertising method, an in-contents advertising server, and a program-transferring medium for realizing in-contents advertising, capable of application to advertising dealing with networks, can be provided.

Further, according to the present invention, an in-contents advertising method, an in-contents advertising server, and a program-transferring medium for realizing in-contents advertising, capable of easily updating the advertisement contents whenever appropriate, can be provided.

The invention claimed is:

1. An in-contents advertising method comprising the steps of:
   (a) activating digital contents in a user terminal in a game program by a user;
   (b) determining that the digital contents have been activated by the user;
   (c) transferring an identifier of the digital contents and an identifier of the user to an advertising information server when the digital contents have been activated by the user;
   (d) selecting and retrieving advertising information by the advertising information server based on the digital contents identifier and the user identifier;
   (e) transferring the retrieved advertising information to the user terminal;
   (f) updating a transmission record for the retrieved advertising information;
   (g) counting a number of times of updating the transmission record of the retrieved advertising information;
   (h) receiving input from the user via a user interface of the game program after the transferring of the retrieved advertising information;
   (i) generating a table of information linking addresses in the advertising information server for the advertising information to the respective insertion locations of the advertising information:
   (j) making a judgment whether or not the insertion location is a position for inserting advertisement information:

(k) positioning the advertisement information on an affirmative judgment;

(l) inserting the retrieved advertising information in the digital contents based on information indicating that advertisements may be inserted when the digital contents are activated in the game program in the user terminal by the user, so that advertising information included in the digital contents is updated with the retrieved advertising information;

(m) billing an advertiser for advertising fees calculated based on the number of times of updating the transmission record of the retrieved advertisement information.

2. The in-contents advertising method of claim 1, further comprising the steps of:

receiving advertisement structure information for the digital contents from a contents provider at the advertising server;

receiving advertiser specified information of the advertiser at the advertising server;

preparing the advertising information based on the advertisement structure information and the advertiser specified information, and receiving the advertising information at the advertising server; and providing the advertising information by the advertising server to the contents provider for insertion in the digital contents.

3. The in-contents advertising method of claim 1, wherein the digital contents comprise:

said information indicating that advertisements may be inserted;

a header including at least a company name and a title;

movie data including graphics data;

the game program;

object data; and a plurality of sets of texture data.

4. The in-contents advertising method of claim 1, wherein:

the digital contents include a moving image;

the retrieved advertising information is inserted in a predetermined part of the digital contents; and the advertising information is included in the predetermined part of the digital contents.

5. The in-contents advertising method of claim 1, wherein:

the game program is a driving game program;

the digital contents include at least one vehicle operated by the user;

the advertisement information is inserted on an exterior of the at least one vehicle; and the advertisement information and the digital contents are dynamically presented to the user.

6. A digital contents distribution system for realizing in-contents advertisements, said distribution system comprising:

a digital contents distribution system comprising a first server storing a plurality of digital contents to be provided;

an advertisement information providing system comprising a database storing advertisement information which is to be set in advertisement areas in said digital contents;

a plurality of user terminal devices;

wherein, in response to download requests for specific digital contents from said user terminal devices, said digital contents distribution system receives advertisement information corresponding to said specific digital contents and user identification information from said database of said advertisement information providing system, inserts said advertisement information in said specific digital contents based on information in the digital contents indicating that advertisements may be inserted, updates a transmission record for the advertisement information, counts a number of times of updating the transmission record of said advertising information, and subsequently distributes said specific digital contents to a user;

wherein the received advertising information is inserted in said specific digital contents by said digital contents distribution system in response to the user requests for specific digital contents, such that the received advertising information is automatically rendered by the user terminal devices upon activating the digital contents in a game program;

wherein the digital contents are activated in the game program at the user terminal devices by the user; and wherein an advertiser is billed for advertising fees calculated based on the number of times that the retrieved advertisement information is transferred;

wherein a table of information links addresses in the advertising information server for the advertising information to the respective insertion locations of the advertising information, a judgment is made whether or not the insertion location is a position for inserting advertisement information: and positioning the advertisement information on an affirmative judgment.

7. A digital contents distribution system according to claim 6, wherein said distribution system configures a network of:

said digital contents distribution system comprising said first server;

said advertisement information providing system comprising said database; and said plurality of user terminal devices;

using one, or two or more, of the following means: cable television, broad-band wireless network, and optical fiber network.

8. A digital contents distribution system according to claim 6, said advertisement information providing system further comprising means for recording the transmission state of said advertisement information, with advertising fees being calculated based on said recording results.

9. A digital contents distribution system according to claim 6, said distribution system further comprising a banking system;

wherein said advertisement information providing system comprises means for recording the transmission state of said advertisement information, with advertising fees being calculated based on said recording results, and the advertiser being billed for said advertising fees from said bank.

10. A digital contents distribution system according to claim 6, wherein said digital contents data contains advertisement programs, with said advertisement information being set into said digital contents by said advertisement programs.

11. The digital contents distribution system according to claim 6, wherein the digital contents comprise:

said information indicating that advertisements may be inserted;

a header including at least a company name and a title;

movie data including graphics data;

the game program;

object data; and a plurality of sets of texture data.

12. A digital contents distribution system for realizing in-contents advertisements, said distribution system comprising:

a digital contents distribution system comprising a first server storing a plurality of digital contents to be provided;

an advertisement information providing system comprising a database storing advertisement information which is to be set in advertisement areas in said digital contents; and a plurality of user terminal devices;

wherein, in response to a download request for specific digital contents from one of said plurality of user terminal devices, said digital contents distribution system transfers an identifier of said specific digital contents and an identifier of said one user terminal device to said advertisement information providing system, and distributes said specific digital contents to said one user terminal device;

wherein said advertisement information providing system retrieves advertisement information from said advertisement information providing system based on said specific digital contents, information in the digital contents indicating that advertisements may be inserted, and said identifier of said one user terminal device and transmits said retrieved advertisement information corresponding to said specific digital contents from said database, to a user, wherein said retrieved advertising information is transmitted in response to the download request for said specific digital contents, such that the retrieved advertising information is automatically rendered by the user terminal device upon activating the digital contents in a game program;

wherein said advertisement information providing system updates a transmission record for the retrieved advertising information and counts a number of times of updating the transmission record of the retrieved advertising information;

wherein the digital contents are activated in the game program at the user terminal devices by the user; and wherein an advertiser is billed for advertising fees calculated based on the number of times that the retrieved advertisement information is transferred;

wherein a table of information links addresses in the advertising information server for the advertising information to the respective insertion locations of the advertising information, a judgment is made whether or not the insertion location is a position for inserting advertisement information: and positioning the advertisement information on an affirmative judgment.

13. The digital contents distribution system according to claim 12, wherein the digital contents comprise:
said information indicating that advertisements may be inserted;
a header including at least a company name and a title;
movie data including graphics data;
the game program;
object data; and
a plurality of sets of texture data.

14. A digital contents providing system comprising a plurality of servers storing digital contents,
wherein said digital contents providing system configures an advertisement information providing system having a database storing advertisement information to be set into advertising areas within said digital contents, and a network;
wherein, in response to a download request for specific digital contents transmitted to said digital contents distribution system by a user, said digital contents distribution system receives advertisement information corresponding to said specific digital contents and an identifier of the user from said database of said advertisement information providing system, inserts said advertisement information in said specific digital contents based on information in the digital contents indicating that advertisements may be inserted, and distributes said advertisement information along with said requested digital contents to said user, wherein said advertising information is distributed to said user in response to the download request for specific digital contents, such that the advertising information is automatically rendered for the user terminal devices upon activating said digital contents in a game program;

wherein said digital contents distribution system updates a transmission record for the advertisement information and counts a number of times of updating the transmission record of said advertising information;

wherein the digital contents are activated in the game program at the user terminal devices by the user; and wherein an advertiser is billed for advertising fees calculated based on the number of times that the retrieved advertisement information is transferred;

wherein a table of information links addresses in the advertising information server for the advertising information to the respective insertion locations of the advertising information, a judgment is made whether or not the insertion location is a position for inserting advertisement information; and positioning the advertisement information on an affirmative judgment.

15. The digital contents providing system according to claim 14, wherein the digital contents comprise:
said information indicating that advertisements may be inserted;
a header including at least a company name and a title;
movie data including graphics data;
the game program;
object data; and
a plurality of sets of texture data.

16. An in-contents advertising method, wherein advertisement information provided beforehand is included in digital contents activated in a contents provider by a user request to the contents provider, the method comprising the steps of:
activating in a user terminal in a game program by a user the digital contents;
determining by the contents provider whether the digital contents have been activated by the user;
transferring an identifier of the digital contents and an identifier of the user by the contents provider to an advertising information server when the digital contents have been activated;
retrieving advertising information from the advertising information server based on the digital contents identifier and the user identifier;
providing the retrieved advertising information to the contents provider for insertion in the digital contents;
wherein the retrieved advertising information is inserted in the digital contents based on information in the digital contents indicating that advertisements may be inserted, the advertisement information being inserted by the contents provider in response to the user request for digital contents, such that the advertising information is automatically rendered by the activation of the digital contents in the game program;
updating a transmission record of the advertising information, wherein a number of times that the transmission record of the retrieved advertising information is updated is counted;

wherein an advertiser is billed for advertising fees calculated based on the number of times that the retrieved advertisement information is transferred;

wherein a table of information links addresses in the advertising information server for the advertising information to the respective insertion locations of the advertising information, a judgment is made whether or not the insertion location is a position for inserting advertisement information; and positioning, the advertisement information on an affirmative judgment.

17. The in-contents advertising method according to claim 16, wherein the digital contents comprise:
    said information indicating that advertisements may be inserted;
    a header including at least a company name and a title;
    movie data including graphics data;
    the game program;
    object data; and
    a plurality of sets of texture data.

* * * * *